(12) United States Patent
Yamaki et al.

(10) Patent No.: US 12,246,313 B2
(45) Date of Patent: Mar. 11, 2025

(54) COMPOSITE PARTICLES AND ION EXCHANGE MEMBRANE

(71) Applicant: AGC Inc., Tokyo (JP)

(72) Inventors: Yasushi Yamaki, Tokyo (JP); Hiromitsu Kusano, Tokyo (JP)

(73) Assignee: AGC Inc., Tokyo (JP)

( * ) Notice: Subject to any disclaimer, the term of this patent is extended or adjusted under 35 U.S.C. 154(b) by 988 days.

(21) Appl. No.: 17/242,848

(22) Filed: Apr. 28, 2021

(65) Prior Publication Data

US 2021/0245148 A1 Aug. 12, 2021

Related U.S. Application Data

(63) Continuation of application No. PCT/JP2019/045133, filed on Nov. 18, 2019.

(30) Foreign Application Priority Data

Nov. 19, 2018 (JP) .................. 2018-216549

(51) Int. Cl.
| | | |
|---|---|---|
| C08L 27/12 | (2006.01) |
| B01D 67/00 | (2006.01) |
| B01J 39/05 | (2017.01) |
| B01J 39/20 | (2006.01) |
| B01J 47/12 | (2017.01) |
| C08J 5/22 | (2006.01) |
| C09D 127/14 | (2006.01) |
| C09D 127/16 | (2006.01) |
| C09D 127/18 | (2006.01) |
| C09D 127/20 | (2006.01) |

(52) U.S. Cl.
CPC .......... B01J 39/05 (2017.01); B01D 67/0093 (2013.01); B01J 39/20 (2013.01); B01J 47/12 (2013.01); C08J 5/2237 (2013.01); C08J 5/2293 (2013.01); C08L 27/12 (2013.01); C09D 127/14 (2013.01); C09D 127/16 (2013.01); C09D 127/18 (2013.01); C09D 127/20 (2013.01); *C08J 2327/12* (2013.01); *C08L 2207/53* (2013.01)

(58) Field of Classification Search
CPC ....... B01D 67/0093; B01J 39/20; B01J 47/12; B01J 39/05; C08J 5/2237; C08J 5/2293; C08J 2327/12; C08J 7/0427; C08L 27/12
See application file for complete search history.

(56) References Cited

U.S. PATENT DOCUMENTS

| | | | | |
|---|---|---|---|---|
| 5,385,780 A | * | 1/1995 | Lee ......................... | B29B 7/28 428/404 |
| 5,595,676 A | * | 1/1997 | Barnes ................. | H01M 8/1025 429/492 |
| 2004/0067401 A1 | * | 4/2004 | Hasegawa .............. | H01B 1/122 429/535 |
| 2017/0029585 A1 | | 2/2017 | Kusano et al. | |

FOREIGN PATENT DOCUMENTS

| WO | WO 02/072694 A1 | 9/2002 |
|---|---|---|
| WO | WO 2016/189000 A1 | 12/2016 |

OTHER PUBLICATIONS

International Search Report issued Jan. 21, 2020 in PCT/JP2019/045133, filed on Nov. 18, 2019 2 pages.

* cited by examiner

*Primary Examiner* — Christina H. W. Rosebach
(74) *Attorney, Agent, or Firm* — Oblon, McClelland, Maier & Neustadt, L.L.P.

(57) ABSTRACT

The present invention provides composite particles which are capable of forming an ion exchange membrane with fewer defects and an ion exchange membrane. The composite particles according to the present invention comprise pellets comprising a fluorinated polymer having groups convertible to ion exchange groups, and a powder held on the pellet surface which comprises a polymer, wherein the powder has an average particle diameter of at least 1 μm and at most 1,000 μm, and the ratio of the average particle diameter of the pellets to the average particle diameter of the powder is 2 to 4,500.

20 Claims, No Drawings

COMPOSITE PARTICLES AND ION EXCHANGE MEMBRANE

TECHNICAL FIELD

The present invention relates to composite particles and an ion exchange membrane.

BACKGROUND ART

Ion exchange membranes comprising fluorinated polymers having ion exchange groups are used in various types of batteries, electrolytic processes and processes for separation of ions and the like.

For production of ion exchange membranes comprising fluorinated polymers, a process using pellets of fluorinated polymers having ion exchange groups or groups convertible to ion exchange groups as a raw material is known (Patent Document 1).

PRIOR ART DOCUMENTS

Patent Documents

Patent Document 1: WO2016/189000

DISCLOSURE OF INVENTION

Technical Problem

The recent dement for ion exchange membrane improved in various properties requires that defects in ion exchange membranes such as holes (e.g. pinholes) and a large variation in thickness should be decreased.

When the present inventors used pellets of fluorinated polymers as disclosed in Patent Document 1, some defective ion exchange membranes were obtained.

In view of the above-mentioned problem, the present invention aims to provide composite particles which are capable of forming ion exchange membranes with fewer defects and an ion exchange membrane.

Solution to Problem

As a result of their extensive studies on the above-mentioned problem, the present inventors have found that the desired effect can be obtained by using composite particles comprising pellets comprising a fluorinated polymer having groups convertible to ion exchange groups and a powder having an average particle diameter within a certain range held on the surface of the pellets, wherein the ratio of the average particle diameter of the pellets to the average particle diameter of the powder is at or above a certain level, and have accomplished the present invention.

Namely, the present inventors have found that the above-mentioned problem is solved by the followings.

[1] Composite particles comprising:
 pellets comprising a fluorinated polymer having groups convertible to ion exchange groups, and
 a powder held on the surface of the pellets which comprise a polymer, wherein the powder has an average particle diameter of larger than 1 μm and at most 1,000 μm, and
the ratio of the average particle diameter of the pellets to the average particle diameter of the powder is 2 to 4,500.

[2] The composite particles according to [1], wherein both the fluorinated polymer and the polymer comprise units based on a fluoroolefin.

[3] The composite particles according to [2], wherein the units based on a fluoroolefin in the fluorinated polymer are the same as the units based on a fluoroolefin in the polymer.

[4] The composite particles according to any one of [1] to [3], wherein both the fluorinated polymer and the polymer comprise units having a group convertible to an ion exchange group.

[5] The composite particles according to [4], wherein the units having a group convertible to an ion exchange group in the fluorinated polymer are the same as the units having a group convertible to an ion exchange group in the polymer.

[6] The composite particles according to [4] or [5], wherein the powder has an average particle diameter of from 2 to 500 μm.

[7] The composite particles according to any one of [1] to [6], wherein the ratio of the average particle diameter of the pellets to the average particle diameter of the powder is from 8 to 2,100.

[8] The composite particles according to any one of [1] to [3], wherein the polymer has no groups convertible to ion exchange groups.

[9] The composite particles according to [8], wherein the powder has an average particle diameter of from 2 to 300 μm.

[10] The composite particles according to [8] or [9], wherein the ratio of the average particle diameter of the pellets to the average particle diameter of the powder is from 10 to 2,100.

[11] The composite particles according to any one of [1] to [10], wherein the content of the powder is from 0.01 to 1 mass % relative to the amount of the pellets.

[12] The composite particles according to any one of [1] to [11], which are used for production of an ion exchange membrane.

[13] An ion exchange membrane which is formed by using the composite particles as defined in any one of [1] to [12].

Advantageous Effects of Invention

According to the present invention, it is possible to provide composite particles capable of forming an ion exchange membrane with fewer defects and an ion exchange membrane.

DESCRIPTION OF EMBODIMENTS

The terms used in the present invention have the following meanings.

A "sulfonic acid functional group" means a sulfonic acid group ($-SO_3H$) or a sulfonate group ($-SO_3M^2$ wherein $M^2$ is an alkali metal or a quaternary ammonium cation).

A "carboxylic acid functional group" means a carboxylic acid group ($-COOH$) or a carboxylate group ($-COOM^1$ wherein $M^1$ is an alkali metal or a quaternary ammonium cation).

A "precursor membrane" is a membrane comprising a polymer having groups convertible to ion exchange groups.

A "group convertible to an ion exchange group" means a group which can be converted to an ion exchange group by treatments such as hydrolysis, conversion to an acid form and conversion to a salt with a different metal cation by cation exchange.

A "group convertible to a sulfonic acid functional group" means a group which can be converted to a sulfonic acid functional group by conventional treatments such as hydrolysis and conversion to an acid form.

A "group convertible to a carboxylic acid functional group" means a group which can be converted to a carboxylic acid functional group by conventional treatments such as hydrolysis and conversion to an acid form.

A "unit" in a polymer mean an atomic group derived from 1 molecule of a monomer by polymerization. A unit may be an atomic group directly formed by a polymerization reaction, or may be an atomic group having a partially different structure obtained by polymerization followed by structural modification.

A "reinforcing material" means a material used to improve the strength of an ion exchange material.

A "reinforcing fabric" means a fabric used as a raw material of a reinforcing material used to improve the strength of an ion exchange material.

"Reinforcing threads" are threads constituting a reinforcing fabric which do not dissolve in an operating device containing an ion exchange membrane.

The "average particle diameter" of a powder is a 50% particle diameter calculated from the volume based particle size distribution of a dispersion of the powder in a solvent measured with a known laser diffraction/scattering particle size distribution analyzer (laser diffraction/scattering particle size distribution analyzer manufactured by Microtrac-BEL Corp. or an instrument based on the same measuring method).

The "particle diameter" of a pellet is a maximum distance between two parallel tangent planes to the pellet measured with a digimatic caliper (manufactured by Mitutoyo Corporation). The distance between two parallel planes is a length of a line segment perpendicular to both planes. The "average particle diameter" of pellets means an arithmetic mean of the particle diameters of 20 pellets.

[Composite Particles]

The composite particles of the present invention (hereinafter referred to also as "the present composite particles") comprise pellets comprising a fluorinated polymer having groups convertible to ion exchange groups (hereinafter referred to also as a "fluorinated polymer (I')") and a powder held on the surface of the pellets which comprises a polymer and has an average particle diameter of at least 1 μm and at most 1,000 μm, and the ratio of the average particle diameter of the pellets to the average particle diameter of the powder is 2 to 4,500.

The composite particles can form an ion exchange membrane with fewer defects, supposedly for the following reasons which have yet to be explained clearly.

In production of ion exchange membranes by molding pellets of a fluorinated polymer into film, adhesion between pellets is one possible reason for defect formation in ion exchange membranes.

It is presumed that in production of ion exchange membranes, adhesion between pellets leads to a large variation in pressure during film formation, and such a large variation in pressure is responsible for defect formation.

Use of the present composite particles in the form of powder-coated pellets solves this problem the powder between pellets reduces the contact area between pellets and prevents adhesion of pellets. Thus, it is supposed that their use can decrease the variation in pressure during film formation and make it possible to produce ion exchange membranes with fewer defects.

Now, the constituents of the present composite particles will be described.

[Pellets]

The pellets in the present composite particles comprise a fluorinated polymer (I').

The fluorinated polymer (I') is a fluorinated polymer having groups convertible to ion exchange groups. The groups convertible to ion exchange groups may be groups convertible to carboxylic acid functional groups or groups convertible to sulfonic acid functional groups.

The fluorinated polymer (I') is preferably such that when the groups convertible to ion exchange groups in the fluorinated polymer (I') are converted to ion exchange groups, the resulting fluorinated polymer (hereinafter referred to also as "fluorinated polymer (I)) has an ion exchange capacity of at least 1.1 meq/g dry resin (hereinafter referred to simply as "meq/g"), particularly preferably at least 1.20 meq/g, for better ion conductivity of the ion exchange membrane, and has an ion exchange capacity of at most 2.00 meq/g, particularly preferably at most 1.90 meq/g for better ion exchange performance.

The fluorinated polymer (I) to be used for measurement of ion exchange capacity is obtained as follows. A fluorinated polymer (I') is treated with heat at 240° C. in a vacuum of −0.1 MPa for 16 hours and soaked in a solution containing dimethyl sulfoxide/potassium hydroxide/water=30/5.5/64.5 (mass ratio) at 95° C. for 30 minutes to hydrolyze the groups convertible to ion exchange groups in the fluorinated polymer (I') into the K salt of the ion exchange groups and then washed with water. Then, the K salt is converted into the Na salt by soaking in a sodium hydroxide aqueous solution to obtain a fluorinated polymer (I) to be used for measurement of ion exchange capacity.

The ion exchange capacity of a fluorinated polymer (I) thus obtained is measured as described later in the Examples.

A fluorinated polymer (I') which converts into a fluorinated polymer (I) having a high ion exchange capacity (for example, 1.1 meq/g or above) (I') is less crystalline and hence has low melting and softening points, although it has the advantage of capable of making a highly ion conductive ion exchange membrane. Pellets of such a fluorinated polymer (I') tend to adhere to each other at 23° C. and cannot be fed steadily to the extruder. Thus, defective ion exchange membranes with irregular thickness are likely to be produced.

The present composite particles solves this problem, and because adhesion between pellets is prevented even when the pellets comprise a fluorinated polymer (I') which converts into a high capacity ion exchange polymer, an ion exchange polymer having high ion conductivity with fewer defects can be obtained.

The fluorinated polymer (I') may be a single species of a combination of two or more species.

The fluorinated polymer (I') is preferably a fluorinated polymer having groups convertible to carboxylic acid functional groups (hereinafter referred to also as "fluorinated polymer (C')") or a fluorinated polymer having groups convertible to sulfonic acid functional groups (hereinafter referred to also as "fluorinated polymer (S')") in view of their high ion exchange performance.

These fluorinated polymers will be described in detail.

(Fluorinated Polymer (C'))

The fluorinated polymer (C') is preferably a copolymer of a fluoroolefin and a monomer having both a group convertible to a carboxylic acid functional group and a fluorine atom (hereinafter referred to also as "fluorine-containing monomer (C')") for better ion exchange performance.

The copolymerization may be carried out by any known technique such as solution polymerization, suspension polymerization or emulsion polymerization.

The fluorine-containing monomer (C') may be any compound having at least one fluorine atom, an ethylenic double bond and a group convertible to a carboxylic acid functional group in the molecule without any particular restrictions and may be a conventionally known compound.

The fluorine-containing monomer (C') is preferably a monomer represented by the following formula (1) in view of the production cost of the monomer, the reactivity with other monomers and the properties of the resulting fluorinated polymer.

$$CF_2=CF—(O)_p—(CF_2)_q—(CF_2CFX)_r—(O)_s—(CF_2)_t—(CF_2CFX')_u-A^1 \quad \text{Formula (1)}$$

In the formula (1), each of X and X' is independently a fluorine atom or a trifluoromethyl group, $A^1$ is a group convertible to a carboxylic acid group such as —CN, —COF, —COOR$^1$ (wherein $R^1$ is a $C_{1-10}$ alkyl group), —COONR$^2$R$^3$ (wherein each of $R^2$ and $R^3$ is independently a hydrogen atom or a $C_{1-10}$ alkyl group), p is 0 or 1, q is an integer of from 0 to 12, r is an integer of from 0 to 3, s is 0 or 1, t is an integer of from 0 to 12, and u is an integer of from 0 to 3, provided that $1 \leq p+s$ and $1 \leq r+u$.

As specific examples of monomers represented by the formula (1), the following compounds may be mentioned, and those wherein p is 1, q is 0, r is 1, s is from 0 to 1, t=from 0 to 3 and u is from 0 to 1 are preferred in view of their easy production.

CF$_2$=CF—O—CF$_2$CF$_2$—COOCH$_3$,

CF$_2$=CF—O—CF$_2$CF$_2$CF$_2$—COOCH$_3$,

CF$_2$=CF—O—CF$_2$CF$_2$CF$_2$CF$_2$—COOCH$_3$,

CF$_2$=CF—O—CF$_2$CF$_2$—O—CF$_2$CF$_2$—COOCH$_3$,

CF$_2$=CF—O—CF$_2$CF$_2$—O—CF$_2$CF$_2$CF$_2$—COOCH$_3$,

CF$_2$=CF—O—CF$_2$CF$_2$—O—CF$_2$CF$_2$CF$_2$CF$_2$—COOCH$_3$,

CF$_2$=CF—O—CF$_2$CF$_2$CF$_2$—O—CF$_2$CF$_2$—COOCH$_3$,

CF$_2$=CF—O—CF$_2$CF(CF$_3$)—O—CF$_2$CF$_2$—COOCH$_3$, and

CF$_2$=CF—O—CF$_2$CF(CF$_3$)—O—CF$_2$CF$_2$CF$_2$—COOCH$_3$.

The fluorinated monomer (C') may be a single species or a combination of two or more species.

The fluoroolefin (C') may, for example, be a $C_{2-3}$ fluoroolefin having at least one fluorine atom in the molecule. Specific examples include tetrafluoroethylene (TFE), chlorotrifluoroethylene, vinylidene fluoride, vinyl fluoride and hexafluoropropylene. Among them, TFE is particularly preferred in view of the production cost of the monomer, the reactivity with other monomers and the properties of the resulting fluorinated polymer.

The fluoroolefin may be a single species or a combination of two or more species.

For the fluorinated polymer (C'), an additional monomer other than the fluorinated polymer (C') and the fluoroolefin may be used. The additional monomer may, for example, be CF$_2$=CFR$^f$ (wherein R$^f$ is a $C_{2-10}$ perfluoroalkyl group), CF$_2$=CF—OR$^{f1}$ (wherein R$^{f1}$ is a $C_{1-10}$ perfluoroalkyl group), CF$_2$=CFO(CF$_2$)$_v$CF=CF$_2$ (wherein v is an integer of from 1 to 3). Copolymerization of an additional monomer improves flexibility and mechanical strength of the ion exchange membrane.

The content of units based on the additional monomer is preferably at most 30 mass % relative to all the units in the fluorinated polymer (C') to secure a certain level of ion exchange performance.

(Fluorinated Polymer (S))

The fluorinated polymer (S') is preferably a copolymer of a fluoroolefin and a monomer having both a group convertible to a sulfonic acid functional group and a fluorine atom (hereinafter referred to also as "fluorine-containing monomer (S')") for better ion exchange performance.

The copolymerization may be carried out by any known technique such as solution polymerization, suspension polymerization or emulsion polymerization.

The fluoroolefin may be any of those mentioned previously and is preferably TFE in view of the production cost of the monomer, the reactivity with other monomers and the properties of the resulting fluorinated polymer (S').

The fluoroolefin may be a single species or a combination of two or more species.

The fluorine-containing monomer (S') may be a compound having at least one fluorine atom in the molecule, and having an ethylenic double bond and a group convertible to a sulfonic functional group.

The fluorine-containing monomer (S') is preferably a compound represented by the formula (2) in view of the production cost of the monomer, the reactivity with other monomers and the properties of the resulting fluorinated polymer (S).

$$CF_2=CF-L-(A)_n \quad \text{Formula (2):}$$

In the formula (2), L is a (n+1)-valent perfluorinated hydrocarbon group which may contain an oxygen atom.

The oxygen atom may be located at the end of the perfluorinated hydrocarbon group or between carbon atoms.

The number of carbon atoms in the (n+1)-valent perfluorinated hydrocarbon group is preferably at least 1, more preferably at least 2 and is preferably at most 20, more preferably at most 10.

L is preferably a (n+1)-valent perfluorinated aliphatic hydrocarbon group, more preferably a divalent perfluoroalkylene group which may contain an oxygen atom when n=1 or a trivalent perfluoroalkylene group which may contain an oxygen atom when n=2.

The divalent perfluoroalkylene group may be linear or branched.

In the formula (2), n is an integer of 1 or 2.

In the formula (2), A is a group convertible to a sulfonic acid functional group. The group convertible to a sulfonic acid functional group is preferably a functional group convertible to a sulfonic acid functional group by hydrolysis. Specific examples of the group convertible to a sulfonic acid functional group include —SO$_2$F, —SO$_2$Cl and —SO$_2$Br.

The compound represented by the formula (2) is preferably a compound represented by the formula (2-1), a compound represented by the formula (2-2) or a compound represented by the formula (2-3).

$$CF_2=CF—O—R^{f1}-A \quad \text{Formula (2-1):}$$

$$CF_2=CF—R^{f1}-A \quad \text{Formula (2-2):}$$

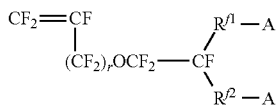

Formula (2-3)

$R^{f1}$ is a perfluoroalkylene group which may contain an oxygen atom between carbon atoms. The number of carbon atoms in the perfluoroalkylene group is preferably at least 1, more preferably at least 2, and preferably at most 20, more preferably at most 10.

$R^2$ is a single bond or a perfluoroalkylene group which may contain an oxygen atom between carbon atoms. The number of carbon atoms in the perfluoroalkylene group is preferably at least 1, more preferably at least 2, and preferably at most 20, more preferably at most 10.

r is an integer of 0 or 1.

A in the formula is the same as defined above.

Specific examples of the compound represented by the formula (2-1) include compounds represented by the following formulae (2-1-1) to (2-1-3).

$$CF_2=CF-O-(CF_2)_w-SO_2F \qquad \text{Formula (2-1-1)}$$

$$CF_2=CF-O-CF_2CF(CF_3)-O-(CF_2)_w-SO_2F \qquad \text{Formula (2-1-2)}$$

$$CF_2=CF-[O-CF_2CF(CF_3)]_x-SO_2F \qquad \text{Formula (2-1-3)}$$

In compounds represented by the above formulae (2-1-1) to (2-1-3), w is an integer of from 1 to 8, and x is an integer of from 1 to 5.

Specific examples of the compound represented by the formula (2-2) include the following compounds wherein w is an integer of from 1 to 8.

$$CF_2=CF-(CF_2)_w-SO_2F$$

$$CF_2=CF-CF_2-O-(CF_2)_w-SO_2F$$

In the above compounds, w is an integer of from 1 to 8.

The compound represented by the formula (2-3) is preferably a compound represented by the formula (2-3-1).

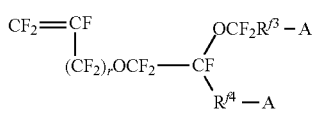

Formula (2-3-1)

In the formula (2-3-1), $R^{f3}$ is a linear $C_{1-6}$ perfluoroalkylene group, $R^{f4}$ is a single bond or a linear $C_{1-6}$ perfluoroalkylene group which may contain an oxygen atom between carbon atoms. r and A in the formula (2-3-1) is the same as defined above.

Specific examples of the compound represented by the formula (2-3-1) include the following compounds:

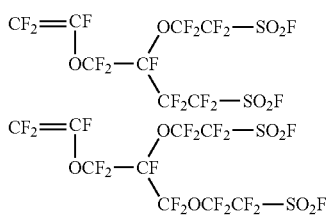

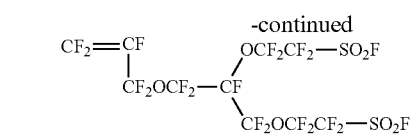

The fluorine-containing monomer (S') may be a single species or a combination of two or more species.

For production of the fluorinated polymer (S'), in addition to the fluoroolefin and the fluorine-containing monomer (S'), an additional monomer may be used. The additional monomer may be any of those mentioned previously.

The content of units based on the additional monomer is preferably at most 30 mass % relative to all the units in the fluorinated polymer (S') to secure a certain level of ion exchange performance.

(Shape and Average Particle Diameter of Pellets)

The pellets may be in any shape without any particular restrictions and may be spherical (or spheroidal) or columnar (for example, cylindrical).

The average particle diameter of the pellets is appropriately chosen so that it satisfies the relationship mentioned later with the average particle diameter of the powder. Specifically speaking, the average particle diameter of the pellets is preferably from 3 to 7 mm, more preferably from 4 to 6 mm for stable film-forming conditions necessary for production of ion exchange membranes with a small variation in thickness.

(Production of Pellets)

The pellets may be produced by a conventionally known method. A specific example of production of pellets comprises extruding a melt of the fluorinated polymer (I') and the like through a die of a melt extruder into strands and chopping the strands into pellets comprising the fluorinated polymer (I').

The melt extruder may be any conventional one such as a single screw extruder, a double screw extruder or a tandem extruder.

The melting temperature for the fluorinated polymer (I') is preferably from 150 to 350° C., particularly preferably from 200 to 300° C.

The pelletizer system may be a so-called strand pelletizer, as in the above-mentioned example, but may be an underwater pelletizer or a hot cut pelletizer.

(Powder)

The powder in the present composite particles is held on the surface of the pellets.

The powder may be a single species or a combination of two or more species.

The powder comprises a polymer. The polymer may be a conventionally known polymer and preferably comprises units based on a fluoroolefin to decrease defects in ion exchange membranes.

The fluoroolefin may be any of those mentioned previously, but is preferably TFE in view of the production cost of the monomer, the reactivity with other monomers and the performance of the resulting ion exchange membrane.

The fluoroolefin may be a single species or a combination of two or more species.

The polymer may comprise units having a group convertible to an ion exchange group to make it easy to obtain an ion exchange membrane with a certain level of ion exchange performance.

The units having a group convertible to an ion exchange group are preferably units based on a monomer having a group convertible to an ion exchange group such as units based on the fluorine-containing monomer (C') or units based on the fluorine-containing monomer (S').

The monomer having a group convertible to an ion exchange group may be a single species or a combination of two or more species.

The polymer may comprise units based on a monomer (hereinafter referred to as an additional monomer) other than units based on a fluoroolefin and units based on a fluorine-containing monomer having a sulfonic acid functional group. The additional monomer may be any of those mentioned previously.

An aspect of the polymer (hereinafter referred to "the first aspect") is a polymer having no groups convertible to ion exchange groups and is preferably a polymer having units based on a fluoroolefin and having no groups convertible to ion exchange groups. The first aspect of the polymer may comprise units based on the above-mentioned additional monomer but is preferably a homopolymer of a fluoroolefin.

Another aspect of the polymer (hereinafter referred to "the second aspect") is a polymer having groups convertible to ion exchange groups. The second aspect of the polymer preferably has units based on a monomer having a group convertible to an ion exchange group and units based on a fluoroolefin. The second aspect of the polymer may comprise units based on the above-mentioned additional monomer, if necessary.

In the case of ion exchange membranes having two or more layers of a fluorinated polymer having ion exchange groups, an ion exchange membrane having a layer formed from composite particles containing the second aspect of the polymer is more resistant to layer separation than an ion exchange membrane having only layers formed from composite particles containing the first aspect of the polymer, because a layer formed from composite particles containing the second aspect of the polymer adheres firmly to other layers.

In the present invention, it is preferred that both the fluorinated polymer in the pellets and the polymer in the powder comprise units based on a fluoroolefin, particularly units based on the same fluoroolefin, to decrease defects in ion exchange membranes.

In the present invention, it is preferred that both the fluorinated polymer in the pellets and the polymer in the powder comprise units having a group convertible to an ion exchange group, particularly units having the same group convertible to an ion exchange group, to secure a certain level of ion exchange performance and prevention of layer separation.

The average particle diameter of the powder is larger than 1 µm and at most 1,000 µm, and is preferably from 2 to 500 µm, particularly preferably from 3 to 300 µm to decrease defects in ion exchange membranes.

A powder having an average particle diameter larger than 1 µm can prevent defect formation in ion exchange membranes because it is unlikely to aggregate and is held on the pellet surface well. An average particle diameter of at most 1,000 µm secures adhesion of the powder to the pellet surface and prevents the powder from remain itself as a defect.

The ratio of the average particle diameter of the pellets to the average particle diameter of the powder (the average particle diameter of the pellets/the average particle diameter of the powder) is at least 2, and is preferably at least 10, more preferably at least 12, particularly preferably at least 15, to decrease defects in ion exchange membranes.

The upper limit of the above-mentioned ratio is 4,500, preferably 1,500, more preferably 1,000, further preferably 700, and particularly preferably 300.

In the first aspect (i.e., when the polymer in the powder has no groups convertible to an ion exchange group), the average particle diameter of the powder is preferably from 2 to 300 µm, more preferably from 3 to 200 µm, particularly preferably from 10 to 50 µm, to prevent formation of defects in ion exchange membranes and improve peeling resistance of ion exchange membranes.

In the first aspect, the ratio of the average particle diameter of the pellets to the average particle diameter of the powder is preferably from 10 to 2,100, more preferably from 20 to 1,400, particularly preferably from 30 to 450, to prevent formation of defects in ion exchange membranes and improve peeling resistance of ion exchange membranes In the second aspect (i.e., when the polymer in the powder has groups convertible to an ion exchange group), the average particle diameter of the powder is preferably from 2 to 500 µm, more preferably from 3 to 300 µm, particularly preferably from 10 to 200 µm, to prevent formation of defects in ion exchange membranes.

In the second aspect, the ratio of the average particle diameter of the pellets to the average particle diameter of the powder is preferably from 8 to 2,100, more preferably from 10 to 1,400, particularly preferably from 20 to 450, to prevent formation of defects in ion exchange membranes.

In the present composite particles, the content of the powder is preferably from 0.01 to 1 mass %, more preferably from 0.03 to 0.7 mass %, particularly preferably from 0.05 to 0.5 mass %, to decrease defects in ion exchange membranes.

(Production of Powder)

The powder may be produced by any known methods. Specifically speaking, the powder may be produced, for example, by pulverizing the polymer after solidification without pelletization, or by pelletizing the polymer by the method described above for the pellets and then pulverizing the resulting pellets.

The pulverization procedure may use a grinder such as a pin mill, a hammer mill or a jet mill. After pulverization, the ground polymer is preferably classified to obtain a powder of a uniform particle diameter.

[Production of Composite Particles]

The present composite particles may be produced by mixing the pellets and the powder in a predetermined ratio, preferably by dry blending using a known mixer.

The present composite particles are preferably used for production of ion exchange membranes used in the applications described later.

[Ion Exchange Membrane]

The ion exchange membrane of the present invention (hereinafter referred to also as "the present ion exchange membrane") is formed from the present composite particles. The present ion exchange membrane formed from the present composite particles has fewer defects.

In a preferred example of production of the present ion exchange membrane, a precursor membrane comprising a fluorinated polymer having groups convertible to ion exchange groups (fluorinated polymer (I')) is formed from the present composite particles, and then the groups convertible to ion exchange groups in the precursor membrane are converted to ion exchange groups to obtain the present ion exchange membrane comprising a fluorinated polymer having ion exchange groups (fluorinated polymer (I)).

[Production of Precursor Membrane]

The precursor membrane may be formed, for example, by extrusion. Specifically speaking, the precursor membrane is obtained by feeding the present composite particles to a known melt film extruder and extruding them into film through the nozzle (such as a T die) of the extruder. The melting temperature for the present composite particles is preferably from 150 to 350° C., particularly preferably from 200 to 300° C.

The precursor membrane may have a reinforcing material inside. The reinforcing material may be put in the precursor membrane by any known method. For example, a reinforcing material may be sandwiched between precursor membranes to form a multi-layer ion exchange membrane. Alternatively, a reinforcing material may be coated with a melt of the present composite particles to obtain a precursor membrane having the reinforcing material inside.

The reinforcing material is preferably a derivative of a reinforcing fabric (preferably a woven fabric). In addition to reinforcing fabrics, fibrils, porous materials and non-woven fabrics may be mentioned as the reinforcing material.

A reinforcing fabric is preferably made of warp yarns and weft yarns orthogonally woven. The reinforcing fabric is preferably made of reinforcing threads and sacrificial threads.

The reinforcing threads are preferably made of a material which will not dissolve when the reinforcing fabric is immersed in an aqueous alkaline solution (such as 32 mass % aqueous sodium hydroxide). Specifically speaking, the reinforcing threads are preferably at least kind of threads selected from polytetrafluoroethylene threads, polyphenylene sulfide threads, nylon threads and polypropylene threads.

"Sacrificial threads" are threads which at least partly dissolve in an operating device containing the ion exchange membrane and are preferably made of a material which dissolves in an aqueous alkaline solution when the reinforcing fabric is immersed in the aqueous alkaline solution. The sacrificial threads may be monofilaments or may be multifilaments composed of two or more filaments.

While the sacrificial threads impart strength to the ion exchange membrane when it is being produced or handled to be installed in a device, they dissolve in an operating device, and thereby lower the resistance of the ion exchange membrane.

[Production of Ion Exchange Membrane]

The preset ion exchange membrane comprising the fluorinated polymer (I) is obtained by converting the groups convertible to ion exchange groups in the fluorinated polymer (I') in the precursor membrane to ion exchange groups.

The conversion of groups convertible to ion exchange groups in the precursor membrane to ion exchange groups may be carried out, for example, by hydrolysis of the precursor membrane and optional conversion of the hydrolysis product to the acid form.

It is particularly preferred to contact the precursor membrane with an aqueous alkaline solution.

Contact of the precursor membrane with an aqueous alkaline solution may be made, for example, by immersing the precursor membrane in the aqueous alkaline solution or by spraying the aqueous alkaline solution onto the surface of the precursor membrane.

The temperature of the aqueous alkaline solution is preferably at least 30° C. and lower than 100° C., in view of efficient production of ion exchange membranes, and the duration of the contact between the precursor membrane and the aqueous alkaline solution is preferably from 3 to 300 minutes.

The aqueous alkaline solution preferably comprises an alkali metal hydroxide, a water-miscible organic solvent and water.

Specific examples of the alkali metal hydroxide are sodium hydroxide and potassium hydroxide, and potassium hydroxide is preferred. The alkali metal hydroxide may be a single species or a combination of two or more species.

The water-miscible organic solvent herein is an organic solvent which easily dissolves in water, and specifically, preferred is an organic solvent with a solubility of at least 0.1 g in 1,000 ml of water (20° C.), and more preferred is an organic solvent with a solubility of at least 0.5 g. The water-miscible organic solvent preferably contains at least one member selected from the group consisting of aprotic organic solvents, alcohols and amino alcohols, and more preferably contains an aprotic organic solvent.

The water-miscible organic solvent may be a single species or a combination of two or more species.

Specific examples of the aprotic organic solvents include dimethyl sulfoxide, N,N-dimethylformamide, N,N-dimethylacetamide, N-methyl-2-pyrrolidone and N-ethyl-2-pyrrolidone, and dimethyl sulfoxide is preferred.

Specific examples of the alcohols include methanol, ethanol, isopropanol, butanol, methoxyethoxyethanol, butoxyethanol, butyl carbitol, hexyloxyethanol, octanol, 1-methoxy-2-propanol and ethylene glycol.

Specific examples of the amino alcohols include ethanolamine, N-methylethanolamine, N-ethylethanolamine, 1-amino-2-propanol, 1-amino-3-propanol, 2-aminoethoxyethanol, 2-aminothioethoxyethanol and 2-amino-2-methyl-1-propanol.

The content of the alkali metal hydroxide in the aqueous alkaline solution is preferably from 1 to 60 mass % The content of the water-miscible organic solvent in the aqueous alkaline solution is preferably from 1 to 60 mass %.

When the contents of the alkali metal hydroxide and water-miscible organic solvent are within the above-mentioned ranges, the present ion exchange membrane can be produced efficiently because the hydrolysis completes quickly.

The content of water in the aqueous alkaline solution is preferably from 39 to 80 mass %.

After the contact of the precursor membrane with an aqueous alkaline solution, the aqueous alkaline solution may be removed. The aqueous alkaline solution may be removed, for example, by washing the precursor membrane which have been contacted with the aqueous alkaline solution with water.

After the contact of the precursor membrane with an aqueous alkaline solution, the resulting ion exchange membrane may be dried, preferably by heating, preferably at a heating temperature of from 50 to 160° C., preferably for a heating time of from 0.1 to 24 hours.

After the conversion of the groups convertible to ion exchange groups in the precursor membrane to ion exchange groups, the present ion exchange membrane may be brought in contact with an aqueous solution containing potassium ion, sodium ion or hydrogen ion to replace the counterion (cation) in the ion exchange group.

Replacement of the cation in the ion exchange group by another cation improves the dimensional stability of the present ion exchange membrane during electrolysis of alkaline water containing the cation.

The precursor membrane or the present ion exchange membrane may have a hydrophilic layer on the surface. The hydrophilic layer may be formed on at least either surface of the precursor membrane or the present ion exchange membrane.

The hydrophilic layer may, for example, be an inorganic particle layer comprising inorganic particles. The inorganic particles are preferably hydrophilic particles resistant to acid and alkali erosion. Specifically speaking, they are preferably particles of at least one substance selected from the group consisting of oxides, nitrides and carbides of elements of the fourth and fourteenth groups of the periodic table, more preferably particles of at least substance selected from the group consisting of $SiO_2$, $SiC$, $ZrO_2$ and $ZrC$, particularly preferably particles of $ZrO_2$.

The hydrophilic layer may comprise a binder. The binder may be a binder conventionally used in a known hydrophilic layer (a gas release layer), such as methylcellulose or a fluorinated polymer having sulfonic acid groups.

The hydrophilic layer may be formed, for example, by coating the precursor membrane or the present ion exchange membrane with a solution comprising inorganic particles and a binder.

The present ion exchange membrane may have a monolayer or multilayer structure. A multilayer ion exchange membrane may be obtained from a precursor membrane formed, for example, by laminating more than one layer of a fluorinated polymer having groups convertible to ion exchange groups by coextrusion.

The thickness of the present ion exchange membrane is preferably at least 30 μm, more preferably at least 40 μm to secure a certain level of strength, and is preferably at most 500 μm, more preferably at most 300 μm, particularly preferably at most 180 μm to attain high current efficiency and high voltage efficiency.

[Fluorinated Polymer (I)]

The fluorinated polymer (I) is a fluorinated polymer obtained by converting the groups convertible to ion exchange groups in the precursor membrane to ion exchange groups.

The fluorinated polymer (I) is preferably a fluorinated polymer having carboxylic acid functional groups (hereinafter referred to also as "fluorinated polymer (C)") or a fluorinated polymer having sulfonic acid functional groups (hereinafter referred to also as "fluorinated polymer (S)") to enhance the effects of the present invention.

Now, each fluorinated polymer will be described in detail.

(Fluorinated Polymer (C))

The fluorinated polymer (C) is preferably obtained by converting the groups convertible to carboxylic acid functional groups in the fluorinated polymer (C') to carboxylic acid functional groups.

The fluorinated polymer (C) preferably comprises units based on a fluoroolefin and units based on a monomer having a carboxylic acid and a fluorine atom.

The fluoroolefin may be any of those mentioned previously.

The fluoroolefin may be a single species or a combination of two or more species.

The units based on a monomer having a carboxylic acid and a fluorine atom are preferably units represented by the following formula (1C).

—[CF$_2$—CF((O)$_p$—(CF$_2$)$_q$—(CF$_2$CFX)$_r$—(O)$_s$—(CF$_2$)$_t$—(CF$_2$CFX')$_u$—COOM$^C$)]—    Formula (1C)

wherein M$^C$ is a hydrogen atom, an alkali metal or a quaternary ammonium cation, and X, X', p, q, r, s, t and u are the same as defined for the formula (1).

Specific examples of units represented by the formula (1C) include the following units, and units wherein p is 1, q is 0, r is 1, s is from 0 to 1, t=from 0 to 3 and u is from 0 to 1 are preferred.

—[CF$_2$—CF(O—CF$_2$CF$_2$—COOM$^C$)]—,

—[CF$_2$—CF(O—CF$_2$CF$_2$CF$_2$—COOM$^C$)]—,

—[CF$_2$—CF(O—CF$_2$CF$_2$CF$_2$CF$_2$—COOM$^C$)]—,

—[CF$_2$—CF(O—CF$_2$CF$_2$—O—CF$_2$CF$_2$—COOM$^C$)]—,

—[CF$_2$—CF(O—CF$_2$CF$_2$—O—CF$_2$CF$_2$CF$_2$—COOM$^C$)]—,

—[CF$_2$—CF(O—CF$_2$CF$_2$—O—CF$_2$CF$_2$CF$_2$CF$_2$—COOM$^C$)]—,

—[CF$_2$—CF(O—CF$_2$CF$_2$CF$_2$—O—CF$_2$CF$_2$—COOM$^C$)]—,

—[CF$_2$—CF(O—CF$_2$CF(CF$_3$)—O—CF$_2$CF$_2$—COOM$^C$)]—, and

—[CF$_2$—CF(O—CF$_2$CF(CF$_3$)—O—CF$_2$CF$_2$CF$_2$—COOM$^C$)]—.

The units based on a monomer having a carboxylic acid functional group and a fluorine atom may be a single species or a combination of two or more species.

The fluorinated polymer (C) may comprise units based on an additional monomer other than a fluoroolefin and a monomer having a carboxylic acid functional group and a fluorine atom.

The additional monomer may be any of those mentioned previously, and the content of units based on the additional monomer is preferably at most 30 mass % relative to all the units in the fluorinated polymer (C) to secure a certain level of ion exchange performance.

(Fluorinated Polymer (S))

The fluorinated polymer (S) is preferably obtained by converting the groups convertible to sulfonic acid functional groups in the fluorinated polymer (S') to sulfonic acid functional groups.

The fluorinated polymer (S) preferably comprises units based on a fluoroolefin and units based on a monomer having a sulfonic acid and a fluorine atom.

The fluoroolefin may be any of those mentioned previously.

The fluoroolefin may be a single species or a combination of two or more species.

The units based on a monomer having a sulfonic acid and a fluorine atom are preferably units represented by the following formula (2S).

—[CF$_2$—CF(-L-(SO$_3$M$^S$)$_n$)]—    Formula (2S)

In the formula (2S), L and n are the same as defined for the formula (2).

M$^S$ is a hydrogen atom, an alkali metal or a quaternary ammonium cation.

The units represented by the formula (2S) are preferably, units represented by the following formula (2S-1), units represented by the following formula (2S-2) or units represented by the following formula (2S-3).

—[CF$_2$—CF(—O—R$^{f1}$—SO$_3$M$^S$)]—    Formula (2S-1)

—[CF$_2$—CF(—R$^{f1}$—SO$_3$M$^S$)]—    Formula (2S-2)

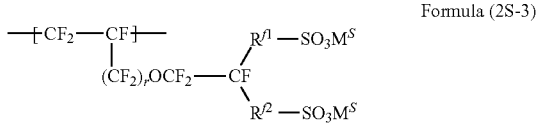

Formula (2S-3)

In the formulae (2S-1) to (2S-3), $R^{f1}$, $R^{f2}$ and r are the same as defined for the formulae (2-1) to (2-3).

$M^S$ is a hydrogen atom, an alkali metal or a quaternary ammonium cation.

Specific examples of units represented by the formula (2S-1) include units represented by the following formulae (2S-1-1) to (2S-1-3).

—[CF$_2$—CF(—O—(CF$_2$)$_w$—SO$_3$M$^S$)]—  Formula (2S-1-1)

—[CF$_2$—CF(—O—CF$_2$CF(CF$_3$)—O—(CF$_2$)$_w$— SO$_3$M$^S$)]—  Formula (2S-1-2)

—[CF$_2$—CF(—(O—CF$_2$CF(CF$_3$))$_x$—SO$_3$M$^S$)]—  Formula (2S-1-3)

wherein w is an integer of from 1 to 8, x is an integer of from 1 to 5, and $M^S$ is the same as defined above.

Specific examples of units represented by the formula (2S-2) include units represented by the following formulae (2S-2-1) to (2S-2-2).

—[CF$_2$—CF(—(CF$_2$)$_w$—SO$_3$M$^S$)]—  Formula (2S-2-1)

—[CF$_2$—CF(—CF$_2$—O—(CF$_2$)$_w$—SO$_3$M$^S$)]—  Formula (2S-2-2)

wherein w is an integer of from 1 to 8, and $M^S$ is the same as defined above.

The units represented by the formula (2S-3) are preferably units represented by the following formula (2S-3-1).

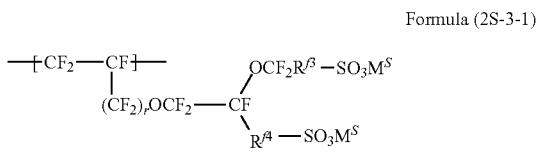

Formula (2S-3-1)

In the formula (2S-3-1), $R^{f3}$, $R^{f4}$ and r are the same as defined above for the formula (2-3-1), and $M^S$ is the same as defined above.

Specific examples of units represented by the formula (2S-3) include the following units.

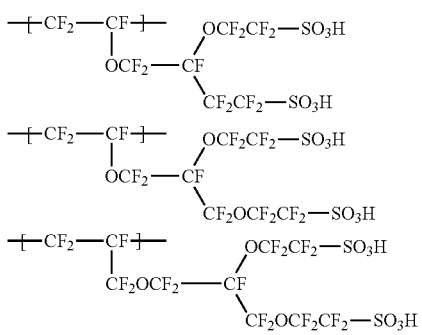

The units based on a monomer having a sulfonic acid functional group and a fluorine atom may be a single species or a combination of two or more species.

The fluorinated polymer (C) may comprise units based on an additional monomer, in addition to units based on a fluoroolefin and units based on a monomer having a sulfonic acid functional group and a fluorine atom.

The additional monomer may be any of those mentioned previously, and the content of units based on the additional monomer is preferably at most 30 mass % relative to all the units in the fluorinated polymer (S) to secure a certain level of ion exchange performance.

[Applications of Ion Exchange Membrane]

The present ion exchange membrane finds its applications, for example, in various batteries such as polymer electrolyte fuel cells, direct methanol fuel cells, redox flow batteries and metal-air electrochemical cells, and in various electrolyzers for alkaline water electrolysis, ozone generation by water electrolysis, chloro-alkali electrolysis, organic electrolysis and chloride or oxide In addition to the above-mentioned applications, it may be used as a separator or a solid electrode in various types of electrochemical cells or for selective cation transfer between cells. In addition to the electrochemical applications, it may be used in the field of sensors in various gas sensors, biosensors, light-emitting devices, optical devices, organic sensors, and solubilization of carbon nanotube, actuators, catalysts and the like.

EXAMPLES

Now, the present invention will be described in detail with reference to Examples, but the present invention is not limited thereto. The amounts of the respective components in Table given later are based on mass.

[Ion Exchange Capacity of Fluorinated Polymer (AR)]

The weight of a fluorinated polymer was measured after 24 hours of incubation in a glove box flushed with dry nitrogen, as the dry mass of the fluorinated polymer. Then, the fluorinated polymer was soaked in 2 mol/L aqueous sodium chloride at 60° C. for 1 hour. The fluorinated polymer was recovered and washed with ultrapure water, and the solution in which the fluorinated polymer had been soaked was titrated with 0.1 mol/L aqueous sodium hydroxide to determine the ion exchange capacity of the fluorinated polymer (meq).

[Average Particle Diameter of Powder]

The average particle diameter (volume-based 50% particle diameter) was measured with a particle size distribution analyzer (laser diffraction/scattering particle size distribution analyzer "MT3300EX II" manufactured by Microtrac-BEL Corp.) using a dispersion of the powder in isopropyl alcohol.

[Average Particle Diameter of Pellets]

The particle diameters of 20 pellets were measured with a digimatic caliper (manufactured by Mitutoyo Corporation), and their arithmetic mean was calculated as their average particle diameter of the pellets. Each pellet was cylindrical in shape.

[Defects in Membrane]

The thickness of an ion exchange membrane was measured at arbitrary 10 points on the ion exchange membrane, and the variation in thickness was calculated using the following equation. The thickness of the ion exchange membrane was determined by analyzing cross sectional images of the ion exchange membrane under an optical microscope using image analysis software.

Variation in thickness (%)=[{(maximum thickness)−(minimum thickness)}/(arithmetic mean thickness)]×100

The ion exchange membrane was checked for pinholes with a pinhole detector (model "TRS-70", manufactured by SANKO ELECTRONIC LABORATORY Co. Ltd.).

The ion exchange membrane was rated for defects based on the variation in thickness and the presence or absence of pinholes on the following scale.

⊚: no pinholes and a variation in thickness of at most 1%
○: no pinholes and a variation in thickness of more than 1% and at most 10%
Δ: no pinholes and a variation in thickness of more than 10% and at most 20%
×: some pinholes or a variation in thickness of more than 20%

[Peeling Resistance]

An ion exchange membrane was installed in a test electrolytic cell having an active area of 1.5 dm² (150 mm long and 100 mm wide) equipped with a punched titanium plate (short axis 4 mm, long axis 8 mm) coated with a solid solution of ruthenium oxide and iridium oxide as an anode and a punched SUS304 plate (short axis 5 mm, long axis 10 mm) coated with ruthenium-containing Raney Nickel by electrodeposition as a cathode, so as to make direct contact between the membrane and the electrodes without a gap.

Electrolysis of aqueous sodium chloride was carried out at a temperature of 90° C., at a current density of 12 kA/m² for 24 hours and at a current density of 8 kA/m² for another 24 hours so that sodium hydroxide was drained from the cathode compartment at a concentration of 32 mass %, and sodium chloride was fed to the anode compartment at a concentration of 50 g/L.

After the electrolysis, the ion exchange membrane was taken out of the electrolytic cell, then checked for separation between the layer (C) and the layer (S) in it and rated for peeling resistance on the following scale.

⊚: no separation or separation over a length of at most 1 mm
○: separation over a length of more than 1 mm and at most 2 mm
Δ: separation over a length of more than 2 mm and at most 5 mm
×: separation over a length of more than 5 mm

[Production of Fluorinated Polymer (S'-1)]

$CF_2=CF_2$ and a monomer represented by the following formula (X1) were copolymerized to obtain fluorinated polymer (S'-1) (ion exchange capacity: 1.25 meq/g). The monomer ratio was so adjusted that the ion exchange capacity of the fluorinated polymer (S'-1) would be the above-mentioned value.

$$CF_2=CF-O-CF_2CF(CF_3)-O-CF_2CF_2-SO_2F \quad (X1)$$

[Production of Fluorinated Polymer (S'-2)]

$CF_2=CF_2$ and a monomer represented by the following formula (X2) were copolymerized to obtain fluorinated polymer (S'-1) (ion exchange capacity: 1.90 meq/g). The monomer ratio was so adjusted that the ion exchange capacity of the fluorinated polymer (S'-2) would be the above-mentioned value.

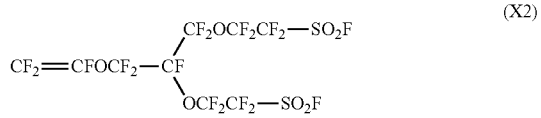

[Production of Fluorinated Polymer (C'-2)]

$CF_2=CF_2$ and a monomer represented by the following formula (Y1) were copolymerized to obtain fluorinated polymer (C'-1) (ion exchange capacity: 1.1 meq/g). The monomer ratio was so adjusted that the ion exchange capacity of the fluorinated polymer (C'-1) would be the above-mentioned value.

$$CF_2=CF-O-CF_2CF_2CF_2-COOCH_3 \quad (Y1)$$

[Production of Fluorinated Polymer (F-1)]

$CF_2=CF_2$ was polymerized to obtain fluorinated polymer (F-1).

The ion exchange capacities mentioned above in [Production of Fluorinated Polymer (S'-1)], [Production of Fluorinated Polymer (S'-2)] and [Production of Fluorinated Polymer (C'-1)] were those of the fluorinated polymers having ion exchange groups obtained after treating the fluorinated polymers (S'-1), (S'-2) and (C'-1) as described below.

A fluorinated polymer having groups convertible to ion exchange groups is treated with heat at 240° C. in a vacuum of –0.1 MPa for 16 hours and soaked in a solution containing dimethyl sulfoxide/potassium hydroxide/water=30/5.5/64.5 (mass ratio) at 95° C. for 30 minutes to hydrolyze the groups convertible to ion exchange groups in the fluorinated polymer into the K salt of the ion exchange groups and then washed with water. Then, the K salt is converted into the Na salt by soaking in aqueous sodium hydroxide to obtain a fluorinated polymer having ion exchange groups to be used for measurement of ion exchange capacity.

Example 1

Fluorinated polymer (S'-1) was fed to a melt extrusion pelletizer, and the melt of fluorinated polymer (S'-1) extruded through dies was solidified into strands by cooling and then chopped to obtain pellets of fluorinated polymer (S'-1).

Then, pellets of fluorinated polymer (S'-1) were pulverized in a grinder, and the ground polymer was classified to obtain a powder of fluorinated polymer (S'-1).

(Production of Ion Exchange Membrane to be Tested for Defects)

The pellets of fluorinated polymer (S'-1) and the powder of fluorinated polymer (S'-1) were blended in a mixer to obtain composite particles in the form of powder-coated pellets.

The composite particles were fed to a film melt extruder and melt at 260° C., and the melt of fluorinated polymer (S'-1) was extruded through a T die into film form to obtain a precursor membrane.

Then, the precursor membrane was soaked in a solution containing dimethyl sulfoxide, potassium hydroxide and water at a ratio of 30/5.5/64.5 (mass ratio) at 95° C. for 30 minutes to hydrolyze the groups convertible to sulfonic acid functional groups in the precursor membrane to potassium sulfonate functional groups, and then the membrane was washed with water. Then, the membrane was soaked in aqueous sodium hydroxide to convert the terminal groups from the potassium salt to the sodium salt, and dried to obtain an ion exchange membrane with a 30 μm thickness. The ion exchange membrane was tested for defects as described above.

(Production of Ion Exchange Membrane to be Tested for Peeling Resistance)

The pellets of fluorinated polymer (S'-1) and the powder of fluorinated polymer (S'-1) were blended in a mixer to obtain composite particles in the form of powder-coated pellets.

Pellets of fluorinated polymer (C'-1) were produced in the same manner as the pellets of fluorinated polymer (S'-1) except that fluorinated polymer (C'-1) was used.

The composite particles and the pellets of fluorinated polymer (C'-1) were coextruded to form a laminated precursor membrane having a bilayer structure comprising a precursor layer (C') (thickness: 12 µm) of fluorinated polymer (C'-1) and a precursor layer (S') (thickness: 68 µm) of fluorinated polymer (S'-1).

The laminated precursor membrane was treated as described above in "Production of Ion Exchange Membrane to be Tested for Defects" to obtain an ion exchange membrane having a layer (C) (derived from the precursor layer (C') by conversion of groups convertible to carboxylic acid functional groups to carboxylic acid functional groups) and a layer (S) (derived from the precursor layer (S') by conversion of groups convertible to sulfonic acid functional groups to sulfonic acid functional groups). The resulting ion exchange membrane was tested for peeling resistance as described above.

Examples 2 to 13 and Comparative Examples 4 and 5

The procedures in Example 1 were followed except that the species of the fluorinated polymer used for production of pellets, the species of the fluorinated polymer used for production of powder, and the contents of the pellets and the powder in the composite pellets were changed as shown in Table 1 to obtain composite particles in the form of powder-coated pellets. The conditions for pulverization of pellets and subsequent classification were changed to obtain the powders having various particle diameters shown in Table 1.

The composite particles were used to produce ion exchange membranes to be tested for defects and for peeling resistance as described in Example 1.

Example 14

Fluorinated polymer (C'-1) was fed to a melt extrusion pelletizer, and the melt of fluorinated polymer (C'-1) extruded through dies was solidified into strands by cooling and then chopped to obtain pellets of fluorinated polymer (C'-1).

Then, pellets of fluorinated polymer (C'-1) were pulverized in a grinder, and the ground polymer was classified to obtain a powder of fluorinated polymer (C'-1).

(Production of Ion Exchange Membrane to be Tested for Defects)

The pellets of fluorinated polymer (C'-1) and the powder of fluorinated polymer (C'-1) were blended in a mixer to obtain composite particles in the form of powder-coated pellets.

The composite particles were fed to a film melt extruder and melt at 260° C., and the melt of fluorinated polymer (C'-1) was extruded through a T die into film form to obtain a precursor membrane.

Then, the precursor membrane was soaked in a solution containing dimethyl sulfoxide, potassium hydroxide and water at a ratio of 30/5.5/64.5 (mass ratio) at 95° C. for 30 minutes to hydrolyze the groups convertible to carboxylic acid functional groups in the precursor membrane to potassium carboxylate functional groups, and then the membrane was washed with water. Then, the membrane was soaked in aqueous sodium hydroxide to convert the terminal groups from the potassium salt to the sodium salt, and dried to obtain an ion exchange membrane with a 30 µm thickness. The ion exchange membrane was tested for defects as described above.

(Production of Ion Exchange Membrane to be Tested for Peeling Resistance)

The pellets of fluorinated polymer (C'-1) and the powder of fluorinated polymer (C'-1) were blended in a mixer to obtain composite particles in the form of powder-coated pellets.

Pellets of fluorinated polymer (S'-1) were produced in the same manner as the pellets of fluorinated polymer (C'-1) except that fluorinated polymer (S'-1) was used.

The composite particles and the pellets of fluorinated polymer (S'-1) were coextruded to form a laminated precursor membrane having a bilayer structure comprising a precursor layer (C') (thickness: 12 µm) of fluorinated polymer (C'-1) and a precursor layer (S') (thickness: 68 µm) of fluorinated polymer (S'-1).

The laminated precursor membrane was treated as described above in "Production of Ion Exchange Membrane to be Tested for Defects" to obtain an ion exchange membrane having a layer (C) (derived from the precursor layer (C') by conversion of groups convertible to carboxylic acid functional groups to carboxylic acid functional groups) and a layer (S) (derived from the precursor layer (S') by conversion of groups convertible to sulfonic acid functional groups to sulfonic acid functional groups). The resulting ion exchange membrane was tested for peeling resistance as described above.

Examples 15 to 13 and Comparative Example 6

The procedures in Example 1 were followed except that the species of the fluorinated polymer used for production of pellets, the species of the fluorinated polymer used for production of powder, and the contents of the pellets and the powder in the composite pellets were changed as shown in Table 1 to obtain composite particles in the form of powder-coated pellets. The conditions for pulverization of pellets and subsequent classification were changed to obtain the powders having various particle diameters shown in Table 1.

The composite particles were used to produce ion exchange membranes to be tested for defects and for peeling resistance as described in Example 14.

Comparative Example 1

Ion exchange membranes to be tested for defects and for peeling resistance were prepared in the same manner as in Example 1 except that pellets of fluorinated polymer (S'-1) were used instead of the composite particles.

Comparative Example 21

Ion exchange membranes to be tested for defects and for peeling resistance were prepared in the same manner as in Example 1 except that pellets of fluorinated polymer (S'-2) were used instead of the composite particles.

Comparative Example 3

Ion exchange membranes to be tested for defects and for peeling resistance were prepared in the same manner as in Example 14 except that pellets of fluorinated polymer (C'-1) were used instead of the composite particles.

The results of the tests are shown in Table 1.

TABLE 1

|  |  | Pellets | | | Powder | | Particle diameter ratio (pellet/powder) | Content of powder relative to pellet (mass %) | Defect | Peeling resistance |
|---|---|---|---|---|---|---|---|---|---|---|
|  |  | Polymer species | AR (meq/g) | Average particle diameter (mm) | Polymer species | AR (meq/g) | Average particle diameter (μm) | | | |
| Ex. | 1 | (S'-1) | 1.25 | 4.2 | (S'-1) | 1.1 | 1000 | 4 | 0.01 | Δ | ⊚ |
|  | 2 | (S'-1) | 1.25 | 4.2 | (S'-1) | 1.1 | 500 | 8 | 0.1 | Δ | ⊚ |
|  | 3 | (S'-1) | 1.25 | 4.2 | (S'-1) | 1.1 | 300 | 14 | 0.1 | ○ | ⊚ |
|  | 4 | (S'-1) | 1.25 | 4.2 | (S'-1) | 1.1 | 200 | 21 | 0.1 | ⊚ | ⊚ |
|  | 5 | (S'-1) | 1.25 | 4.2 | (S'-1) | 1.1 | 200 | 21 | 1 | ⊚ | ⊚ |
|  | 6 | (S'-1) | 1.25 | 4.2 | (F-1) | — | 253 | 17 | 0.1 | ⊚ | Δ |
|  | 7 | (S'-1) | 1.25 | 4.2 | (F-1) | — | 12 | 350 | 0.1 | ⊚ | ⊚ |
|  | 8 | (S'-1) | 1.25 | 4.2 | (F-1) | — | 300 | 14 | 0.01 | ⊚ | Δ |
|  | 9 | (S'-1) | 1.25 | 4.2 | (F-1) | — | 3 | 1400 | 0.01 | ⊚ | ○ |
|  | 10 | (S'-1) | 1.25 | 4.2 | (F-1) | — | 3 | 1400 | 0.1 | ⊚ | ○ |
|  | 11 | (S'-2) | 1.9 | 4.2 | (S'-2) | 1.9 | 200 | 21 | 0.1 | ⊚ | ⊚ |
|  | 12 | (S'-2) | 1.9 | 4.2 | (F-1) | — | 253 | 17 | 0.1 | ⊚ | Δ |
|  | 13 | (S'-2) | 1.9 | 4.2 | (F-1) | — | 3 | 1400 | 0.1 | ⊚ | ○ |
|  | 14 | (C'-1) | 1.1 | 4.2 | (C'-1) | 1.1 | 300 | 14 | 0.1 | ○ | ⊚ |
|  | 15 | (C'-1) | 1.1 | 4.2 | (C'-1) | 1.1 | 200 | 21 | 0.1 | ⊚ | ⊚ |
|  | 16 | (C'-1) | 1.1 | 4.2 | (C'-1) | 1.1 | 12 | 350 | 0.1 | ⊚ | ⊚ |
|  | 17 | (C'-1) | 1.1 | 4.2 | (F-1) | — | 253 | 17 | 0.1 | ⊚ | Δ |
|  | 18 | (C'-1) | 1.1 | 4.2 | (F-1) | — | 253 | 50 | 0.1 | ⊚ | ⊚ |
|  | 19 | (C'-1) | 1.1 | 4.2 | (F-1) | — | 12 | 350 | 0.1 | ⊚ | ⊚ |
| Com. Ex. | 1 | (S'-1) | 1.25 | 4.2 | — | — | — | — | — | X | ⊚ |
|  | 2 | (S'-2) | 1.9 | 4.2 | — | — | — | — | — | X | ⊚ |
|  | 3 | (C'-1) | 1.1 | 4.2 | — | — | — | — | — | X | ⊚ |
|  | 4 | (S'-1) | 1.25 | 4.2 | (S'-1) | 1.1 | 1 | 4200 | 0.1 | X | ○ |
|  | 5 | (S'-2) | 1.9 | 4.2 | (S'-2) | 1.9 | 1 | 4200 | 0.1 | X | ○ |
|  | 6 | (C'-1) | 1.1 | 4.2 | (C'-1) | 1.1 | 1 | 4200 | 0.1 | X | ○ |

Table 1 shows that ion exchange membranes with fewer defects were obtained when composite particles comprising pellets of a fluorinated polymer having groups convertible to ion exchange groups and a powder with an average particle diameter within a particular range held on the pellet surface wherein the ratio of the average particle diameter of the pellets to the average particle diameter of the powder is at or above a certain level, were used (Examples 1 to 19).

In particular, comparison between Examples 4 and 6 (which used powders with similar average particle diameters at the same ratio to the pellets) indicates that when a powder comprising units having a group convertible to an ion exchange group is used (as in Example 4), an ion exchange membrane with high peeling resistance is obtained.

In contrast, when no powder was used (Comparative Examples 1 to 3), and when a powder having an average particle diameter outside the range of larger than 1 μm and at most 1,000 μm (Comparative Examples 3 to 6), ion exchange membranes with many defects were obtained.

This application is a continuation of PCT Application No. PCT/JP2019/045133 filed on Nov. 18, 2019, which is based upon and claims the benefit of priority from Japanese Patent Application No. 2018-216549 filed on Nov. 19, 2018. The contents of those applications are incorporated herein by reference in their entireties.

What is claimed is:

1. Composite particles, comprising:
   pellets comprising a fluorinated polymer having groups convertible to ion exchange groups; and
   a powder comprising a polymer and held on a surface of the pellets comprises a polymer,
   wherein the polymer of the powder comprises units based on a fluoroolefin,
   the powder has an average particle diameter of larger than 1 μm and at most 1,000 μm, and
   a ratio of an average particle diameter of the pellets to an average particle diameter of the powder is 2 to 4,500.

2. The composite particles according to claim 1, wherein the fluorinated polymer comprises units based on a fluoroolefin.

3. The composite particles according to claim 2, wherein the units based on a fluoroolefin in the fluorinated polymer are the same as the units based on a fluoroolefin in the polymer of the powder.

4. Composite particles, comprising:
   pellets comprising a fluorinated polymer having groups convertible to ion exchange groups; and
   a powder comprising a polymer and held on a surface of the pellets,
   wherein the powder has an average particle diameter of larger than 1 μm and at most 1,000 μm,
   a ratio of an average particle diameter of the pellets to an average particle diameter of the powder is 2 to 4.500, and
   both the fluorinated polymer and the polymer of the powder comprise units having a group convertible to an ion exchange group.

5. The composite particles according to claim 4, wherein the units having a group convertible to an ion exchange group in the fluorinated polymer are the same as the units having a group convertible to an ion exchange group in the polymer of the powder.

6. The composite particles according to claim 4, wherein the powder has an average particle diameter of from 2 to 500 μm.

7. The composite particles according to claim 1, wherein the ratio of the average particle diameter of the pellets to the average particle diameter of the powder is from 8 to 2,100.

8. The composite particles according to claim 1, wherein the polymer of the powder has no groups convertible to ion exchange groups.

9. The composite particles according to claim 8, wherein the powder has an average particle diameter of from 2 to 300 μm.

10. The composite particles according to claim 8, wherein the ratio of the average particle diameter of the pellets to the average particle diameter of the powder is from 10 to 2,100.

11. The composite particles according to claim 1, wherein the content of the powder is from 0.01 to 1 mass % relative to the amount of the pellets.

12. The composite particles according to claim 1, which are capable of forming an ion exchange membrane.

13. The composite particles according to claim 1, wherein the polymer of the powder comprises units having a group convertible to an ion exchange group.

14. The composite particles according to claim 1, wherein the fluorinated polymer comprises monomer units of Formula (1), $CF_2=CF-(O)_p-(CF_2)_q-(CF_2CFX)_r-(O)_s-(CF_2)_t-(CF_2CFX')_u-A^1$ (1), where each of X and X' is independently a fluorine atom or a trifluoromethyl group, $A^1$ is $-CN$, $-COF$, $-COOR^1$ or $-COONR^2R^3$, $R^1$ is a $C_{1-10}$ alkyl group, each of $R^2$ and $R^3$ is independently a hydrogen atom or a $C_{1-10}$ alkyl group, p is 0 or 1, q is an integer of from 0 to 12, r is an integer of from 0 to 3, s is 0 or 1, t is an integer of from 0 to 12, u is an integer of from 0 to 3, 1≤p+s, and 1≤r+u.

15. The composite particles according to claim 1, wherein the fluorinated polymer comprises units of Formula (1C), $-[CF_2-CF((O)_p-(CF_2)_q-(CF_2CFX)_r-(O)_s-(CF_2)_t-(CF_2CFX')_u-COOM^C)]-$ (1C), where each of X and X' is independently a fluorine atom or a trifluoromethyl group, $M^C$ is a hydrogen atom, an alkali metal or a quaternary ammonium cation, p is 0 or 1, q is an integer of from 0 to 12, r is an integer of from 0 to 3, s is 0 or 1, t is an integer of from 0 to 12, u is an integer of from 0 to 3, 1≤p+s, and 1≤r+u.

16. The composite particles according to claim 1, wherein the fluorinated polymer comprises monomer units of Formula (2), $CF_2=CF-L-(A)_n$ (2), where L is a (n+1)-valent perfluorinated hydrocarbon group which has a carbon atom of at least 1 and at most 20 and may contain an oxygen atom, n is an integer of 1 or 2, and A is $-SO_2F$, $-SO_2Cl$ or $-SO_2Br$.

17. The composite particles according to claim 1, wherein the fluorinated polymer comprises monomer units of at least one selected from the group consisting of Formula (2-1), Formula (2-2) and Formula (2-3), $CF_2=CF-O-R^{f1}-A$  Formula (2-1), $CF_2=CF-R^{f1}-A$  Formula (2-2),

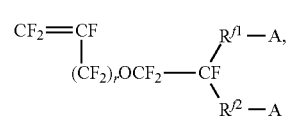

Formula (2-3)

where $R^{f1}$ is a perfluoroalkylene group which has 1 to 20 carbon atoms and may contain an oxygen atom, $R^{f2}$ is a single bond or a perfluoroalkylene group which has 1 to 20 carbon atoms and may contain an oxygen atom, r is an integer of 0 or 1, and A is $-SO_2F$, $-SO_2Cl$ or $-SO_2Br$.

18. The composite particles according to claim 4, wherein both the fluorinated polymer and the polymer of the powder comprise units based on a fluoroolefin.

19. The composite particles according to claim 4, wherein the fluorinated polymer comprises monomer units of Formula (1), $CF_2=CF-(O)_p-(CF_2)_q-(CF_2CFX)_r-(O)_s-(CF_2)_t-(CF_2CFX')_u-A^1$ (1), where each of X and X' is independently a fluorine atom or a trifluoromethyl group, $A^1$ is $-CN$, $-COF$, $-COOR^1$ or $-COONR^2R^3$, $R^1$ is a $C_{1-10}$ alkyl group, each of $R^2$ and $R^3$ is independently a hydrogen atom or a $C_{1-10}$ alkyl group, p is 0 or 1, q is an integer of from 0 to 12, r is an integer of from 0 to 3, s is 0 or 1, t is an integer of from 0 to 12, u is an integer of from 0 to 3, 1≤p+s, and 1≤r+u.

20. The composite particles according to claim 4, wherein the fluorinated polymer comprises units of Formula (1C), $-[CF_2-CF((O)_p-(CF_2)_q-(CF_2CFX)_r-(O)_s-(CF_2)_t-(CF_2CFX')_u-COOM^C)]-$ (1C), where each of X and X' is independently a fluorine atom or a trifluoromethyl group, $M^C$ is a hydrogen atom, an alkali metal or a quaternary ammonium cation, p is 0 or 1, q is an integer of from 0 to 12, r is an integer of from 0 to 3, s is 0 or 1, t is an integer of from 0 to 12, u is an integer of from 0 to 3, 1≤p+s, and 1≤r+u.

* * * * *